United States Patent
Lutkenhaus

(10) Patent No.: US 8,068,741 B2
(45) Date of Patent: Nov. 29, 2011

(54) POLARIZATION TO PHASE CONVERTER

(75) Inventor: Norbert Lutkenhaus, Erlangen (DE)

(73) Assignee: Magiq Technologies, Inc., Somerville, MA (US)

( * ) Notice: Subject to any disclaimer, the term of this patent is extended or adjusted under 35 U.S.C. 154(b) by 2410 days.

(21) Appl. No.: 10/472,837

(22) PCT Filed: Apr. 10, 2002

(86) PCT No.: PCT/US02/08251
§ 371 (c)(1), (2), (4) Date: Feb. 24, 2004

(87) PCT Pub. No.: WO02/084337
PCT Pub. Date: Oct. 24, 2002

(65) Prior Publication Data
US 2004/0151321 A1    Aug. 5, 2004

Related U.S. Application Data

(60) Provisional application No. 60/283,017, filed on Apr. 11, 2001.

(51) Int. Cl.
H04B 10/00    (2006.01)
H04B 10/04    (2006.01)

(52) U.S. Cl. .......................... 398/152; 398/188; 380/256

(58) Field of Classification Search .................. 398/152, 398/188, 184, 65; 380/256
See application file for complete search history.

(56) References Cited

U.S. PATENT DOCUMENTS

| 5,307,410 A | 4/1994 | Bennett |
| 5,953,421 A | 9/1999 | Townsend |
| 6,188,768 B1 * | 2/2001 | Bethune et al. ............... 380/278 |

FOREIGN PATENT DOCUMENTS

WO    WO 97/44936    * 11/1997

OTHER PUBLICATIONS

Chiianga et al, "Towards practical quantum cryptography," Appl. Phys. B 69, 389-393 (1999).

* cited by examiner

*Primary Examiner* — M. R. Sedighian
(74) *Attorney, Agent, or Firm* — Opticus IP Law, PLLC

(57) ABSTRACT

The invention provides an apparatus and method for time delaying different polarization components of a signal relative to one another, comprising a polarization signal splitter which splits first and second polarization components of an input signal into a first component signal and a second component signal such that said first component signal propagates along a first path and the second component signal propagates along a second path, wherein said first component signal reaches a location relative to when said second component reaches said location at times differing by a delayed time, and use of the apparatus in a communication system. The apparatus may be used for quantum cryptography, to convert a sender's polarization-qubit signal into a signal appropriate for channels and receivers based on phase-encoded schemes.

5 Claims, 4 Drawing Sheets

Interference State ~ $(e^{i\phi} \pm e)|V,\tau\rangle$

| 301 Input Polarizations: | 302 Output Phase θ: | 303 Receiver Phase Φ: | 304 Receiver Output Port: |
|---|---|---|---|
| 305 Right ◯ | −π/2 | 0<br>π/2 | Wrong Basis<br>D0 (−) |
| 306 Left ◯ | π/2 | 0<br>π/2 | Wrong Basis<br>D1 (+) |
| 307 +45° ↗ | 0 | 0<br>π/2 | D1 (+)<br>Wrong Basis |
| 308 −45° ↘ | π | 0<br>π/2 | D0 (−)<br>Wrong Basis |

Present Invention · Possible Quantum Crypto Receiver Settings and Output Ports (Bit Values) for BB84

*Fig. 3*

POLARIZATION TO PHASE CONVERTER

CROSS-REFERENCE TO RELATED APPLICATIONS

This application claims priority to U.S. provisional application Ser. No. 60/283,017, filed Apr. 11, 2001, the teachings of which are incorporated herein by reference.

BACKGROUND OF THE INVENTION

1. Field of the Invention

This invention relates to the fields of optical and electromagnetic communications and cryptography.

2. Description of the Background

Sender-receiver units for communication decode information at the sender end based upon expected encoding format at the receiver end. Methods for encoding information use the polarization of an optical signal and the phase between time-separated components of an optical signal, respectively. Quantum cryptography is disclosed in C. H. Bennett and G. Brassard, "Quantum Cryptography: Public Key distribution and coin tossing," in Proceedings of IEEE International Conference on Computers, Systems, and Signal Processing, IEEE, pp.175-9 (1984), and referred to herein as "BB84." BB84 premises a protocol named quantum key distribution, which employs two sets of quantum states with two members in each set. The two members of each set are orthogonal to one another, but the members of one set are not orthogonal to the members of the other set.

The methods of encoding information mentioned above translate into two basic categories of effective orthogonal states, polarization and phase, that have been developed for establishing a quantum key by transmitting optical qubits through free space, optical fibers, or other media. Qubit is the name for the encoded quantum degree of freedom, here polarization or phase. In the polarization category, weak optical signals, ideally single photon states, are sent from the sender Alice to the receiver Bob [C. H. Bennett and G. Brassard, IBM Technical Disclosure Bulletin 28, 3153 (1985)]. A sufficient choice for the four polarization directions might be the set of right and left circularly polarized light fields plus the set of linearly polarized light fields making angles ±45' with respect to the horizontal and vertical. (Note that optical polarizations in uniform media are normally defined with respect to the propagation direction of the light and the plane perpendicular to that direction. The horizontal and vertical directions lie in that perpendicular plane.) These four polarization vectors can be written in a compact form in terms of a phase difference between horizontal and vertical polarization directions, $$\vec{h}$$

and $$\vec{v},$$

as $$\vec{\varepsilon}(\theta) = \vec{h} + e^{i\theta}\vec{v},$$

where $\theta = -\pi/2, \pi/2, 0,$ and $\pi$ for right circular, left circular, 45° linear, and −45° linear polarizations, respectively. Thus, the information in a polarization-based signal is uniquely given by this phase $\theta$. In quantum cryptography, Alice makes a random choice of the polarization of her signal, while Bob selects a polarization basis at random for detection. The process allows for the distillation of a secure quantum key. Crucially, Alice and Bob have devices designed to send and process only the quantum information contained in the polarization of the light signals.

In the phase category of quantum key distribution, Alice encodes the quantum information in the random phase of a signal she sends to Bob [C. Bennett, PTO/US5307410; P. D. Townsend, J. G. Rarity, and P. R. Tapster, Elect Lett 29, 1291 (1993); A. Ekert et al., "Quantum Cryptography", in D. Bouwmeester, A. Ekert, A. Zeilinger, *The Physics of Quantum Information*, Springer-Verlag, Berlin, p. 32 (2000)]. Using an interferometer with unequal path lengths and an input field pulse envelope E~f (t) in time, Alice creates an outgoing electromagnetic field signal of the form $E(t) \sim (f(t-\tau)+e^{i\theta}f(t))/\sqrt{2}$, where $\theta$ is the relative phase difference between outgoing field pulses that is imposed by an (active) phase modulator in one of the interferometer paths, and $\tau$ is the time delay of one of the interferometer paths relative to the other. The input field polarization here is not specified since it contains no information. Here, all of the information is contained in the imposed phase $\theta$. To implement BB84, the active but random choice among the phases $0, \pi,$ and $\pm\pi/2$ by Alice here is analogous to the choice of four polarization directions in the polarization-based scheme above. In the phase-encoding case, Bob's measurement consists of imposing a phase 0 or $\pi/2$ randomly on the signal at his receiver end in his own interferometer. Constructive and destructive interference of the combined phases imposed by Alice and Bob allow a secret quantum bit to be established. Again, Alice and Bob have devices designed to send and process the quantum information only as phase-encoded signals.

The quantum cryptography work of Chiangga and coworkers used 853 nm optical pulses of approximately 10 ns duration at a 2 MHz repetition rate to encode, send, and receive polarization qubits. See S. Chiangga et al., Appl Phys B 69 (1999).

K. J. Blow, R. Loudon, and S. J. Phoenix, Phys Rev A 42, 4102 (1990) describes propagation of a single photon, that is an eigenstate of the number operator with eigenvalue N=1 for the longitudinal modes in quantum optics.

W. Tittel, G. Ribordy, and N. Gisin, "Quantum Cryptography", Physics World 3, 41 (1998) describes a phase-encoded quantum cryptography scheme.

P. Townsend, PTO/US5953421, discloses two schematics. One assumes a polarization-based sender and receiver. The other schematic assumes a phase-based sender and receiver.

S. Chiannga et al., Appl Phys B 69 (1999) discloses use of expensive devices for phase modulators or active phase manipulation in order to generate polarization qubits.

C. Santori et al., Phys Rev Lett 86, 1502 (2001) discloses that triggered true single photon sources may emit photons along only a particular polarization direction.

PCT publication WO 9744936, naming Townsend as inventor, discloses a phase-based quantum cryptography scheme.

W. Tittel, G. Ribordy, and N. Gisin, Quantum Cryptography, Physics World 3, 41 (1998) discloses how to avoid instability of separated interferometers.

U.S. Pat. No. 5,768,378 to Townsend discloses employing quantum cryptography in a passive network environment.

U.S. Pat. No. 6,028,935 to Rarity et al. discloses a passive quantum cryptographic detector set-up.

The teachings of N. Gisin et al., http://xxx.lanl.gov/abs/quant-ph/0101098, are hereby incorporated by reference.

The present inventors realized that polarization signals coupled to a transmission channel may require active stabilization control owing to polarization rotations through optical elements, birefringence, polarization mode dispersion, and thermal and mechanical fluctuations.

The present inventors realized that a sender may want to create deterministic or random polarization-based signals, while the receiver may want to receive a phase-encoded signal. The present invention provides this capability by allowing polarization-based signals to be converted into phase-encoded signals for transmission and/or reception. By assuming a polarization-based signal is what is input into a system of the present invention, the system also eliminates the active phase modulation required for phase-based senders.

SUMMARY OF THE INVENTION

An object of the present invention is to provide systems and methods for secure communications.

Another object of the present invention is to provide a system and method to allow signals where the information is encoded in the polarization state of the field (or a sequence of specific or random polarization states) to be converted into signals where the information is encoded in the relative phase of outgoing field components in the same or arbitrary polarization states.

Another object of the invention is to provide a system and method to provide information encoded by both a phase and time difference between two signals that have coherence.

Another object of the invention is to enable determination of when encoded information arrives at a receiver by time synchronizing the encoded information to an easily detectable strong signal.

Another object of the invention is to use the encoding provided by the invention with pre-existing methods of time synchronizing.

These and other objects of the invention are provided by an apparatus and method of its use f for time delaying different polarization components of a signal relative to one another, comprising a polarization signal splitter which splits first and second polarization components of an input signal into a first component signal and a second component signal such that said first component signal propagates along a first path and the second component signal propagates along a second path, wherein said first component signal reaches a location relative to when said second component reaches said location at times differing by a delayed time. These and other objects of the invention are also provided by a system and method of its use for transmitting information, comprising a signal generator which is designed to generate an input signal; a polarization signal splitter which splits first and second polarization components of said input signal into a first component signal and a second component signal such that said first component signal propagates along a first path and the second component signal propagates along a second path, wherein said first component signal reaches a location relative to when said second component reaches said location at times differing by a delayed time; and a receiver for coherently receiving said first component signal and said second component signal, thereby generating a coherence signal representative of said input signal.

With reference to a specific embodiment, these and other objects of the invention are provided by systems, such as shown in FIG. 1, that map the phase θ (which defines information by state of polarization, a polarization-based information signal) into the informational phase θ of a phase-based scheme (in other words, a time delay scheme). Thus, the invention allows polarization-based signals in quantum cryptography to be converted into phase-encoded signals for transmission and/or reception.

In accordance with the system and method of the present invention, an input signal consists of an electromagnetic field pulse or a sequence of field pulses in one or a combination of a number of possible polarization directions or states. The input signal of the invention thus constitutes an input signal encoded with information in the polarization degree of freedom.

The system of the invention uses a polarization dependent signal splitter to split an input signal into two components each of which then propagates along a different path. The polarizations of the two input components are substantially (to the extent provided by the polarization dependent signal splitter) orthogonal to one another.

The splitter sends a first component of the input field into the first path and a second component into the second path. Note that only the polarizations of the two input components need to be substantially orthogonal. The polarizations of the two output paths can have any specific relationship, provided that the users know this specific relationship either through the design or through some means of measurements and perhaps feedback control. However, for simplicity, in what follows, we assume that the polarizations of the first path and the second path are also substantially orthogonal.

The system is structured to provide, after the split, specified changes in polarization of at least one of the two field components, a relative time delay between the two components, and then to recombine the two components. Since the two components each have the same spatial coherence, but with a specified polarization difference and a time difference, they are coherent, but out of polarization and time phase with one another. The system is structured to provide the specified changes in polarization and time sequence using time delay lines, polarization filters, spatial mode filtering, or other phase shifts, according to the specific type of input signal and end use application. For example, the system of the preferred embodiment delays the first path with respect to the second path. In addition, the preferred embodiment may adjust the polarizations and spatial modes of the components on either or both paths. At the point in space where the two components combine and then propagate along the same path, the polarizations and/or the spatial modes of the two components may be the same or different, depending on the settings of the components along the first and second paths (ie, between the input signal and the output). In the preferred embodiment (see FIG. 1), the system is structures so that the output signal corresponding to each input signal consists of two components (or pulses) of the same polarization which are separated in time by a temporal delay. The preferred embodiment provides the time-separated components of the output signal a unique phase relative to one another, and the unique phase is mapped passively from the polarization or polarizations of the input signal. Passively in this context refers to passive components, which are components that are not controlled by an external control signal to adjust the amount of phase change they provide to a component or signal.

The output of the system constitutes a phase-encoded signal and may be coupled to any suitable transmission medium for transmission to a receiver.

Preferably, the input signal which contains the information to be encoded and transmitted is time sequenced to another easily detectable signal, a time sequencing signal, to facilitate the receiver's determining when information is being received. The time sequencing signal may be transmitted in a separate medium from the input signal. This has been described in Bennett U.S. Pat. No. 5,307,410.

Another possibility is to send the time sequencing signal simultaneously with the information signal in the same medium. For example, the time sequence signal can be at a wavelength different from the information signal, or it may be a signal of any wavelength transmitted a predetermined time in advance or after the information signal. Wavelength division multiplexing can be employed by combining the signals from the quantum channel, timing channel, and a public channel into a common medium, as described in Townsend U.S. Pat. No. 5,675,648.

The encoding provided by the present system is effective for all input signal polarizations signal strengths for a coherent input signal. Thus, this system enables transmission of information using very low intensity information input signals The coherent input signals may be of any statistical type: classical states of the field, states with large average photon numbers, weak or strong coherent states, single photon states, or other quantum states, as long as the information of importance is initially encoded in the polarization. Moreover, the system may include attenuators located to attenuate either the input or output intensity to a desired signal level.

The output signal may be transmitted through either a polarization-preserving or a non-polarization-preserving medium; optical fibers in the case of the preferred embodiment shown in FIG. 1. The relative phase between time-separated output signals from the system of the present invention remains essentially unchanged by the properties of the transmission medium through with the output signal travels, since both components of the output signal experience the same polarization changes. Therefore, the system of the invention provides signals that are suitable for use in a phase-encoded quantum cryptography scheme.

Use of the invention for quantum cryptography offers several advantages. In the quantum regime of single photons, the polarization directions described by vectors in classical optics can be thought to represent the single photon basis states in the two-dimensional Hilbert space orthogonal to the photon's propagation direction.

The invention provides the ability for a sender to convert polarization into a phase-encoded scheme without using expensive devices, such as Pockels cells, and moots a need for active polarization stabilization.

Second, the system of the present invention may be used to convert single photons provided by triggered true single photon sources that emit photons along only a particular polarization direction into a phase-encoded signal, once qubits are encoded.

So, if a pulse is split into two pulses that are time and phase shifted relative to one time-separated pulses with a relative phase difference between them emerge from system 20, as adjusted within the invention's apparatus, the signal's fidelity during transmission may not be effected by fluctuating, deleterious effects on polarization that would otherwise occur if the polarized information were transmitted directly. In other words, each of the two pulses are subject to the same polarization effects while the relative phase between them is maintained, preserving the information from the original input state's polarization.

Further, the input signal does not have to be coherent. It is the coherence between the two components of the split signal that is important. Therefore, the method of the invention works for a general state.

The system and method of the present invention may be inserted into pre-existing communication systems to improve those systems. For example, the phase-based quantum cryptography scheme disclosed in WO 9744936 could be modified to include the system of the present invention Another example of a quantum key generation system of this invention is a combination of the phase-based receiving interferometer for quantum cryptography disclosed in BB84 combined with a polarization-based sender system, such as that shown in FIG. 1.

DESCRIPTION OF THE FIGURES

FIG. 3 is a table showing relationships between a sender's polarization qubits, a receiver's phase-based measurement, and quantum cryptographic bits element 203 of FIG. 2.

DESCRIPTION OF THE PREFERRED EMBODIMENTS

Figure 1:
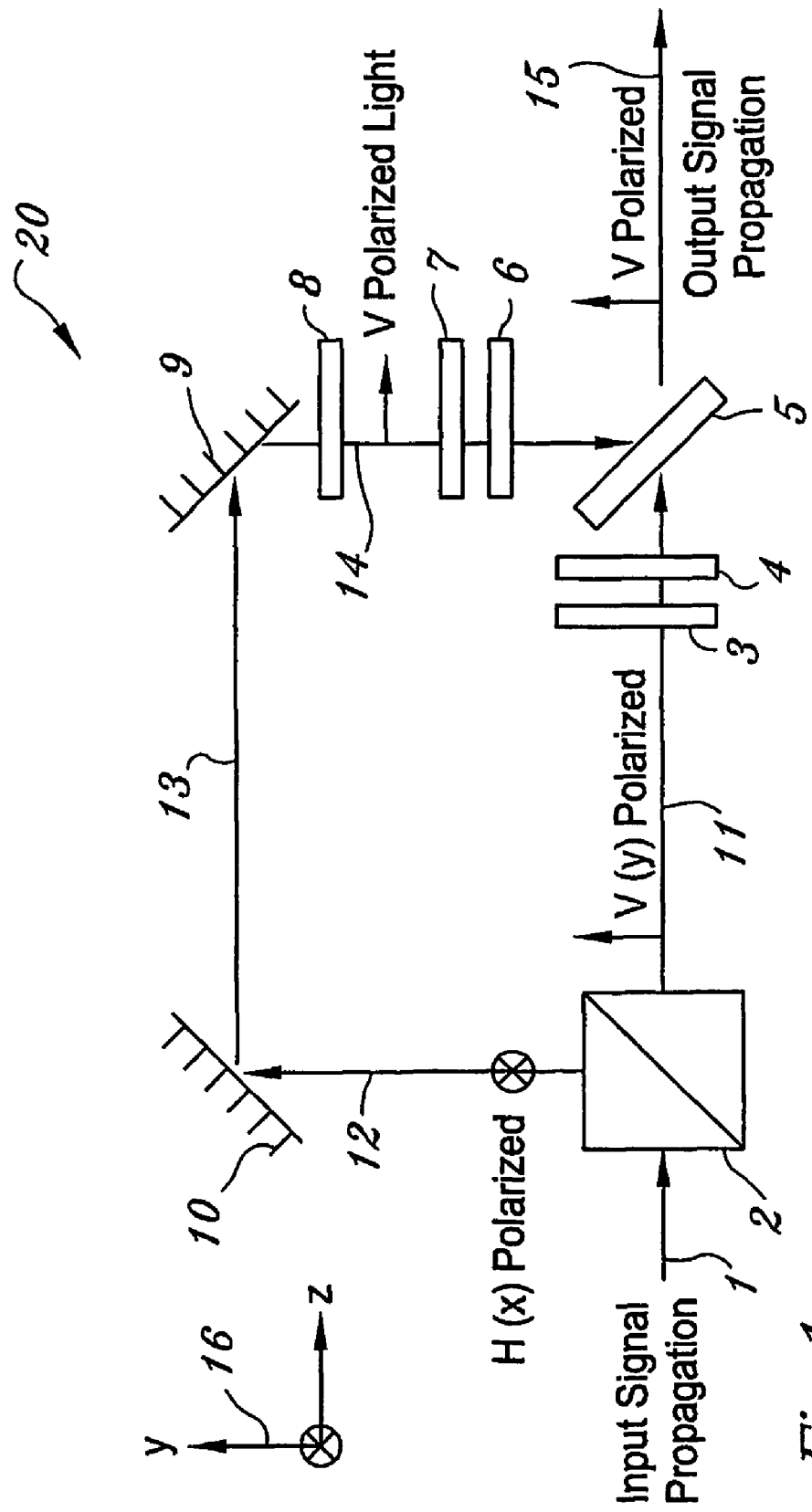
FIG. 1 is a schematic of the apparatus embodying the present invention.

FIG. 1 shows system 20, wave or light pulse paths, and a coordinate system. System 20 includes polarizing beam splitter 2, half wave plate 3, polarizer 4, beam splitter 5, phase shifter 6, polarizer 7, half wave plate 8, mirror 9, 10. Waves are shown along paths 1, 11, 12, 13, 14, and 15. Y-Z coordinate system is shown at 16.

System 20 is configured so that polarizing beam splitter 2 splits input light signals propagating along path 1 into two signals. A first split signal propagates along path 11 such that a portion of that split signal passes through half wave plate 3, polarizer 4, and beam splitter 5. A second split signal propagates initially along path 12, is substantially reflected by mirrors 10, 9, and part of that reflected signal propagates through half wave plate 8, polarizer 7, phase shifter 6, and is reflected by beam splitter 5. The portions of the first and second split signals that propagate through beam splitter 5 propagate along path 15. The portions of the first and second split signals that propagate through beam splitter 5 have a coherence that defines a time difference and polarization difference between them. The time difference and polarization difference are induced by system 20.

Incoming coherent light propagating along path 1 may consist of a combination of four polarization states: right circular, left circular, positive 45 degrees, and negative 45 degrees polarizations. (Negative and positive are relative to the polarization of light that traveled along one of the paths.) System 20 may convert these input polarizations into relative output phase differences between the two coherent signals, respectively, of negative 45 degrees, 45 degrees, zero, and 90 degrees.

System 20 may form part of an interferometer. Useful input light pulse trains have coherence lengths (pulse widths) shorter than the time delay $\tau$ defined below, and a repetition rate smaller than the inverse of the time for a pulse to transit (transit time) through system 20.

An example of an input source is 853 nm optical pulses of approximately 10 ns duration, and a 2 MHz repetition rate. In this example, the criteria just mentioned require either a minimum optical delay $\tau > 20$ ns or a physical path difference of greater than 6 m. Both this delay and path length difference are easily achieved using pulses propagating in optical fiber or in free space. Other preferred embodiments are system using components designed for wavelengths 1310 nm or 1550 nm, since these wavelengths are in widespread use in telecommunications systems. Preferred embodiments are systems whose components are designed for wavelengths currently used for telecommunication. However, the inventor contemplates systems designed to use any wavelength. Preferably, system is designed so that the following two conditions are met: (1) the pulse length is shorter than the induced path length delay and (2) the pulse repetition rate is smaller than the inverse of the path length difference induced delay. Wavelengths useful in embodiments include radio wave, microwave, far infrared, infrared, visible, and ultraviolet.

In operation of system 20, light propagate in the (y-z) plane of the page in FIG. 1. As a result, S-polarization (i.e., polarization directed in the plane of incidence) for the input signal lies along the y-direction, and P-polarization (i.e., polarization perpendicular to the plane of incidence) is directed along the x-direction (which is into the page in FIG. 1). These polarization states are also called (H)orizontal and (V)ertical, and shown as such along paths 11, 12. Each input signal propagating along the z-direction is typically polarized in one of four polarization, right circular, left circular, plus 45 degrees, and minus 45 degrees.

The theory of the operation of system 20 can be described using polarization vector and a state ket in the transverse direction of the single photon Hilbert space or classical states of a polarized field. The input-output transformations of the photon creation operators corresponding to the set-up of FIG. 1 can be constructed to apply to any input state of the field. For the single photon of the preferred embodiment, coherent superpositions of the horizontally and vertically polarized input operators then lead directly to the state transformations and possible output states that follow.

The input creation operators relevant to the present invention create single photon modes from the vacuum with four different polarizations. K. J. Blow, R. Loudon, and S. J. Phoenix, Phys Rev A 42, 4102 (1990) describes a theory of field quantization using pulsed continuum modes propagating in a straight line. Extending this theory, we can define these operators heuristically in their rest frame as $b_R^\dagger(t)$, $b_L^\dagger(t)$, $b_{45°}^\dagger(t)$, and $b_{-45°}^\dagger(t)$. They operate on the vacuum to create single photon field pulses of a desired shape traveling toward the input port in FIG. 1 with right circular, left circular, linear polarization at 45° in the x-y plane, and linear polarization at −45° in the x-y plane, respectively. Parenthetically, the eigenstates of the corresponding annihilation operators are continuum coherent states with a well-defined photon flux and photon number, which may be relevant to other embodiments of the present invention that use coherent states of light. We can decompose these creation operators in terms of similar operators, $b_H^\dagger(t)$ and $b_V^\dagger(t)$, for the horizontal and vertical polarizations along the x- and y-axes, respectively, by writing $b_j^\dagger(t) = b_H^\dagger(t) + e^{i\theta_j} b_V^\dagger$ for $$\{j, \theta_j\} \in \{\{R, -\pi/2\}, \{L, \pi/2\}, \{45°, 0\}, \{-45°, \pi\}\} \tag{0.1}$$

In other words, $$b_R^\dagger(t) = b_H^\dagger(t) - i b_V^\dagger(t) \tag{0.2}$$

$$b_L^\dagger(t) = b_H^\dagger(t) + i b_V^\dagger(t) \tag{0.3}$$

$$b_{45°}^\dagger(t) = b_H^\dagger(t) + b_V^\dagger(t) \tag{0.4}$$

$$b_{-45°}^\dagger(t) = b_H^\dagger(t) - b_V^\dagger(t). \tag{0.5}$$

The phase $\theta_j$ that appears in the polarization decomposition of the input states will be mapped directly into the relative phase difference between output signal components by the system of the present invention without the need for a phase modulator or similar active device.

Corresponding to each these input creation operators $b_j^\dagger(t)$, an output creation operator, $d_j^\dagger(t) = (b_V^\dagger(t-\tau) + e^{i\theta_j} b_V^\dagger(t))/2$, for the apparatus in FIG. 1 can be defined. Immediately, the map of the input field polarization into the phase difference between time-separated modes in a single polarization for the preferred embodiment is evident, $$b_R^\dagger(t) \to d_R^\dagger(t) = (b_V^\dagger(t-\tau) - i b_V^\dagger(t))/2 \tag{0.6}$$

$$b_L^\dagger(t) \to d_L^\dagger(t) = (b_V^\dagger(t-\tau) + i b_V^\dagger(t))/2 \tag{0.7}$$

$$b_{45°}^\dagger \to d_{45°}^\dagger(t) = (b_V^\dagger(t-\tau) + b_V^\dagger(t))/2 \tag{0.8}$$

$$b_{-45°}^\dagger \to d_{-45°}^\dagger(t) = (b_V^\dagger(t-\tau) - b_V^\dagger(t))/2. \tag{0.9}$$

The temporal displacement by time delay $\tau$ of the two component operators that superpose to make up each output creation operator is made explicit. The method and apparatus to perform this mapping are expanded on below in the discussion of the transformations of the field states (as opposed to the field operators).

The operator transformations above are general. The preferred embodiment essentially describes their action on the vacuum to create the single photon input modes and the corresponding output modes. The input creation operators (0.2)-(0.5) create the following input kets from the vacuum, $|j\rangle = (|H\rangle + e^{i\theta_j}|V\rangle)/\sqrt{2}$. In the circular basis, the input field polarization could be in one of the two orthogonal states, right circular $$|R\rangle = (|H\rangle - i|V\rangle)/\sqrt{2} \tag{0.10}$$

and left circular $$|L\rangle = (|H\rangle + i|V\rangle)/\sqrt{2}. \tag{0.11}$$

In a linear 45° basis, the input field polarization could be in one of two other states orthogonal to one another, $$|45°\rangle = (|H\rangle + |V\rangle)/\sqrt{2} \tag{0.12}$$

and $$|-45°\rangle = (|H\rangle - |V\rangle)/\sqrt{2}. \tag{0.13}$$

The states from the linear 45° basis are not orthogonal to the circular basis, and each state ket's time-dependence as a pulse that travels into the PBS is suppressed in the notation for now. These single photon states might be launched into the PBS one at a time.

All optical components necessary to implement system 20 are available from Optics for Research, Oriel, Meadowlark Optics or other quality optical component sellers. The orthogonal eigenmodes of the Polarizing Beam Splitter (PBS) 2 are set to be the linear basis set, $|H\rangle$ and $|V\rangle$. The former is reflected into path 12, while the latter is transmitted into path 11. All of the circular and linear 45° basis states have projection amplitudes onto PBS 2 bases that are equal in magnitude but different in phase, and therefore the exit states of the PBS 2 after a circular or linear 45° input state are distinct for each input state. In fact, the relative phase $\theta_j$ (0.1) between $|H\rangle$ and $|V\rangle$ for each of the input states of equations (0.10)-(0.13) uniquely identifies the input state and will become the relative phase difference between time-separated output components of the field, as described above. Additional phase shifts at PBS 2 have been ignored as unimportant to the main operation of system 20 and can be corrected, if desired, as mentioned below.

Signals can propagate along paths 12 and 11 through free space or through another material medium, such as a fiber optic or waveguide. The length of paths 12, 13, 14 are designed such that they temporally delays the $|H\rangle$ component by a time $\tau$ compared to the $|V\rangle$ component propagating in path 11, such that $\tau$ is long compared to the optical pulse width.

In free space embodiments, the functions of the elements described for system 20 can be replaced by fiber or guided wave equivalents to achieve the same results. For example, the mirrors seen in FIG. 1 may not be needed in an optical fiber delay line with 50-50 fiber couplers. Several other possible substitutions, changes, or removals are discussed below. The path length difference between paths 11 and 12, 13, 14 that provides the time delay can be adjusted precisely, for example, by moving the position of the mirrors with respect to PBS 2 in FIG. 1 or adjusting the length of optical fibers, if fibers are used. If necessary, additional hardware, such as precision positioners, with or without active or real time positional feedback and control, can be introduced to stabilize the desired path difference.

Assume the signal on path 11 reaches the half-wave plate 3 without a change in its polarization state from horizontal $|H\rangle$. Take $|V\rangle$ (or more precisely in-plane polarization S) as the desired polarization state at beam splitter 5. Before impinging beam splitter 5, the signal on path 11 travels through half wave plate 3, set at an angle of 45.degree. with respect to $|H\rangle$, which rotates the polarization of the path 11 signal to the state $|V\rangle$. If necessary, polarizer 4, set to transmit $|V\rangle$ immediately before beam splitter 5, could compensate for any deviation from $|V\rangle$ after half wave plate 3 (e.g., from alignment, thermal, mechanical, or other fluctuations within path 11). Alternatively, the signal in path 11 could be set to any other fixed polarization state by the half wave plate 3 and guaranteed to be in a defined polarization by polarizer 4.

If the signal traversing paths 12, 13, 14 reaches beam splitter 5 still polarized along the y-direction as $|V\rangle$, then half wave plate 3 and polarizer 4 are unnecessary. Otherwise, they could be used either to correct for unintended polarization rotations occurring in the signal traversing paths 12, 13, 14, or to align the polarization at beam splitter 5 to a polarization other than $|V\rangle$.

Moreover, the signals on paths 11 and 12, 13, 14 may acquire a relative phase $\psi$ with respect to one another during propagation. If desired, phase shifter 6 or other phase compensator could be used to correct this residual phase difference between the two paths to isolate the relative phase difference $\theta_j$ of importance. Beam splitter 5 is substantially polarization insensitive, and preferably a 50-50 beam splitter. At the spatial point where the two paths meet, the polarizations and spatial modes from each path must overlap, even though the signal along one path is delayed temporally.

The target polarization at BS shown in FIG. 1 is set to S-polarization. However, the exact polarization at beam splitter 5 is unimportant.

Optical components in FIG. 1 such as 7, 8, 4, 6 are compensating components that are unnecessary in principle but are useful in practice to guarantee the conditions for mode overlap of the signals propagating on path 11, and paths 12, 13, 14, when they exit along path 15.

Spatial filters or other optical components, which do not appear in FIG. 1, may be used to align the spatial modes and polarizations at beam splitter 5. Similarly, the optical delay lines defined by paths 11, and 12, 13, 14 can be formed from any medium, which may eliminate the need for some of the components shown in FIG. 1. For example, use of optical fiber may moot the mirrors 10, 9, but then require fiber optic couplers to couple signals into or out of the fiber.

Ignoring the propagation phase $\psi$ and other possible errors introduced by the components of system 20, the input-output mode transformations can be written ideally from equations (0.6)-(0.9) as $$|R\rangle \rightarrow (|V,\tau\rangle - i|V\rangle)/2 \qquad (0.14)$$

$$|L\rangle \rightarrow (|V,\tau\rangle + i|V\rangle)/2 \qquad (0.15)$$

$$|45°\rangle \rightarrow (|V,\tau\rangle + |V\rangle)/2 \qquad (0.16)$$

$$|-45°\rangle \rightarrow (|V,\tau\rangle - |V\rangle)/2, \qquad (0.17)$$

where $|V,\tau\rangle$ represents the time delay $\tau$ of a vertically polarized signal from path 11 with respect to its pair from path 12, 13, 14. The state of the output field is now reminiscent of the sender stage of the long-short sender paths of phase-encoding schemes for quantum cryptography disclosed in U.S. Pat. No. 5,307,410.

Both of the BS output ports superpose the time-separated field components from the input ports, such that half of the field pulse energy is directed into each, hence the normalization of the output operators in equations (0.6)-(0.9) and the output field modes in equations (0.14)-(0.17). This embodiment of the invention uses only one of these ports, as indicated in FIG. 1, and thus half of the signal intensity (e.g., half of a sequence of single photons) is lost to the other port. In principal, the unused port also contains states of a form similar to equations (0.14)-(0.17) that can be used, as in an embodiment described below. The output signal consists of two identically polarized pulses, separated in time by $\tau$, with a relative phase between them unique to each input polarization, as seen in the inset of FIG. 1. As in phase-encoded schemes for information transmission, the pulses and their relative phase remain coherent with respect to one another as they propagate to a receiver. In reality, the pulses are two temporal peaks of a single coherent signal. In this way, if one of the four states in equations (0.10)-(0.13), relevant for a BB84 quantum cryptography scheme, impinges on the current embodiment, the polarization information is converted into a phase-encoded signal.

After output, the state can propagate through a birefringent medium and/or quantum channel, such as an optical fiber or atmospheric disturbance, and maintain its fidelity. (Here, we are ignoring other loss mechanisms and assume the channel medium response is identical for each of the separated pulses.) Polarization rotations affect each component of the field in the same way now, preserving the relative phase and thus the information from the original polarization encoding.

For example, in quantum cryptography, this preferred embodiment can be used to transform a sender's polarization qubits into a phase-encoded scheme that feeds directly into a receiver's measurement interferometer after propagation along a (quantum) transmission channel between sender and receiver. In this case, the optical delay between the two paths in system 20 can be seen in some sense as the sender's half of an interferometer. Thus, the present invention's optical delay line and path lengths preferably are stabilized with respect to a receiver's delay line, for interferometric stability. For this purpose, air gaps or other passive or active means may be useful. Moreover, combinations of stacked quarter-half-quarter wave plates may be used to stabilize the polarization in various optical schemes. See, for example, N. Gisin et al., http://xxx.lanl.gov/abs/quant-ph/0101098.

Figure 2:
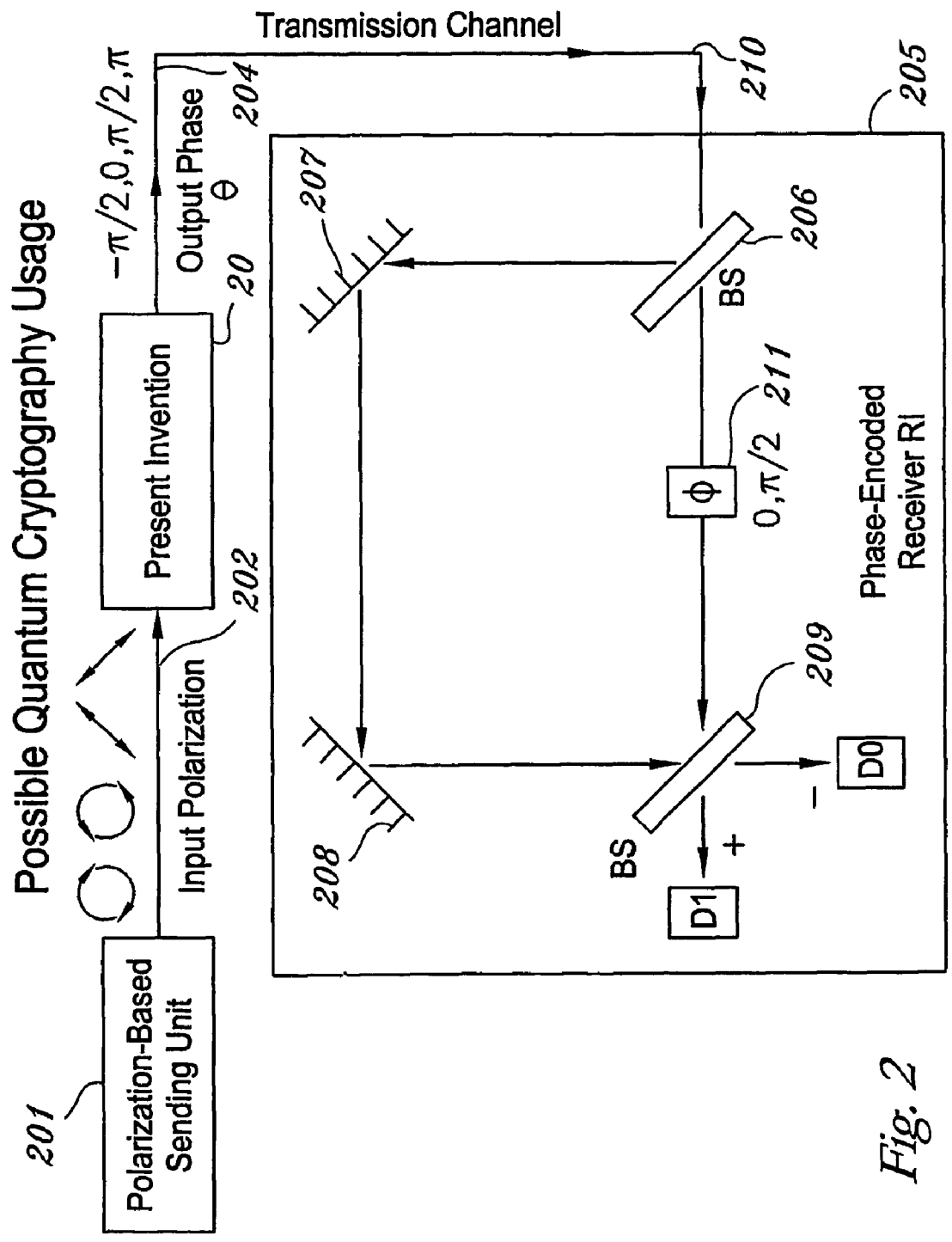
FIG. 2 is a schematic showing structure of the present invention in a quantum cryptography transmission detection system.

FIG. 2 shows use in quantum cryptography, a schematic of a system disclosed in BB84, but in which system 20 has been included.

FIG. 3 shows the possible quantum cryptographic bits for the system of FIG. 2.

FIG. 2 shows a sending unit 201, system 20 as described in FIG. 1, a transmission channel 210, and receiver 205.

In FIG. 2., sending unit 201 generates input pulses having an input polarization and that propagate along path 202. The system is designed so that the input pulses are received and processed by system 20. System 20 transmits an output signal along transmission channel 210. Receiver 205 receives and processes the transmitted signal. Receiver 205 preferably includes an interferometer including beam splitter 206, mirrors 207, 208, and beam splitter 209. Receiver 205 preferable includes an interferometer including beam splitter or fiber optic coupler 206, mirrors or waveguides for steering the photons 207, 208, and a beam splitter or fiber coupler. An example of a suitable receiver is the Mach-Zhender implementation depicted in FIG. 16 of N. Gisin et al., http://xxx.lanl.gov/abs/quant-ph/0101098.

Preferably, the receiver will a Mach-Zecher interferometer set-up, such as the setup described in the receiver end disclosed in U.S. Pat. No. 5,307,410 to Bennett.

Receiver 205 splits the signal into a long path and a short path using a 50-50 beam splitter or fiber coupler. The short path of receiver 205 contains phase modulator 211 that imposes the phase $\phi$, chosen randomly for BB84 between the receiver phases $\phi=0$ and $\phi=\pi/2$, while the long path of receiver 205 is matched to the optical delay $\tau$ of the present invention. As a result, recombination of the paths in receiver 205 at a second 50-50 beam splitter will be led to constructive and destructive interference between signal amplitudes that went through the short-long path and the long-short path. In terms of equations (0.14)-(0.17), the short-long path corresponds to the second component of each output mode traveling through the long path of receiver 205, while the long-short path corresponds to the first component of each output mode traveling the short path of receiver 205 and receiving a phase shift $\phi$. In this example, the random choice $\phi=\pi/2$ corresponds to Bob's choice of the circular measurement basis of Alice's original polarization scheme, while the choice $\phi=0$ corresponds to the linear 45° measurement basis. The output ports of receiver 205's second beam splitter may have detectors behind them, one detector D0 perhaps assigned a bit value zero for destructive interference (port) and the other D1 assigned the value one for constructive (+ port). Of the eight possibilities for Alice and Bob's phase pair, four are thrown out when Bob announces his basis as part of the BBS4 protocol and four lead to raw quantum key bits.

These ideas are summarized in FIG. 3, where the sign in the possible interference signal applies to detection events in the constructive D1 (+) or destructive D0 (−) output ports of the receiver's final beam splitter.

Figure 4:
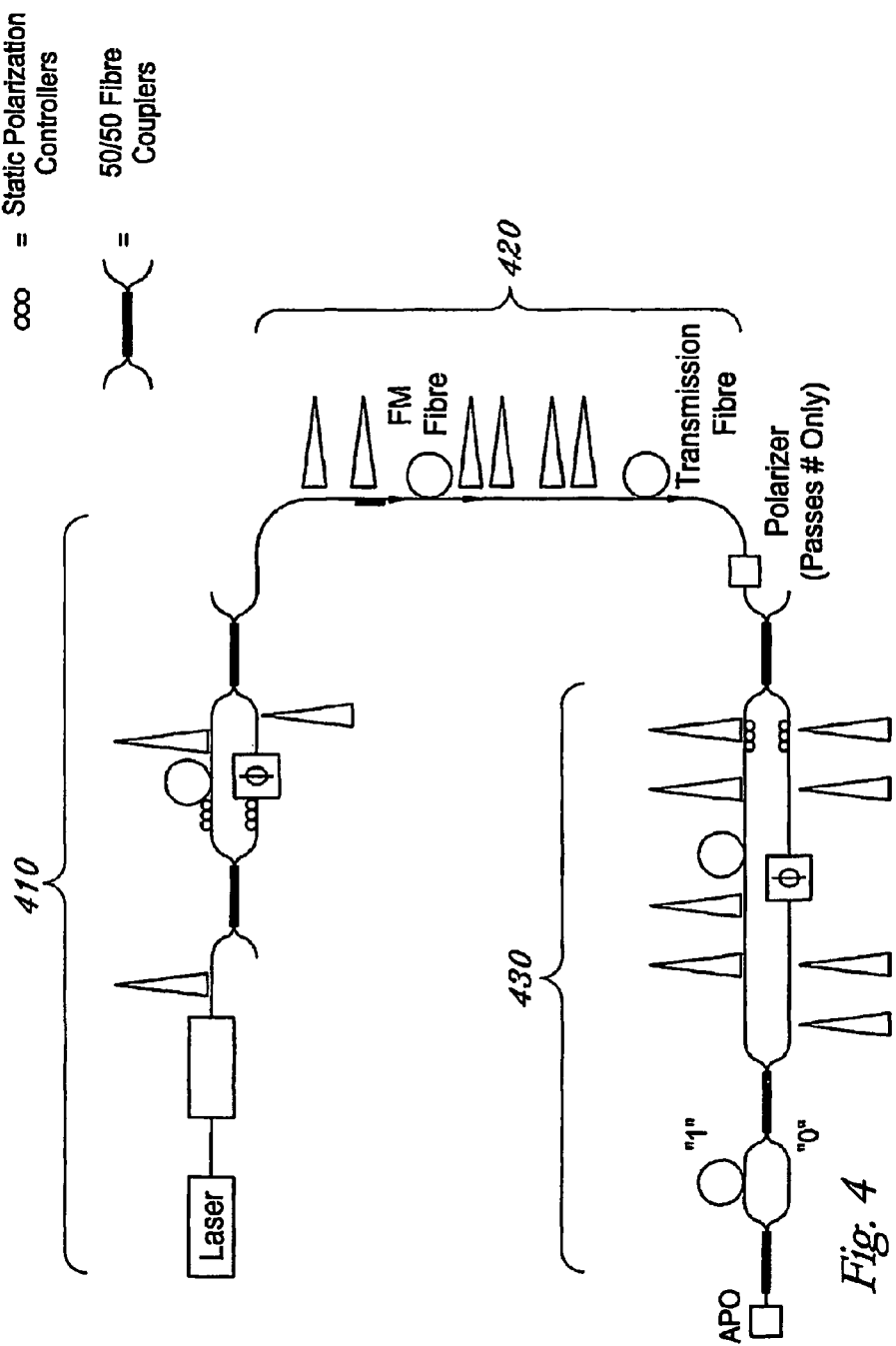
FIG. 4 shows a purely phase-encoded quantum cryptography communication system.

FIG. 4 herein is a reproduction of FIG. 4 in WO 9744936. FIG. 4 herein shows in transmission and encoding system 410, transmission region 420, and detection and decoding region 430. The apparatus shown in of FIG. 4 in WO 9744936 could be modified to employ the present invention by replacing elements labeled 1-6 in FIG. 4 in WO 9744936, shown as element 410 herein, i.e., up to the output of the sending interferometer, and inserting elements of system 20 in their place. FIG. 4 is exemplary of how the system 20 of the present invention may be employed with existing communication systems.

In another embodiment of the present invention, the present invention converts polarization to phase information for optical signals of arbitrary intensity from a coherent source, such as a laser. Such a device operates with same apparatus as the preferred embodiment, as shown in FIG. 1.

In another embodiment of the present invention, optical signals are attenuated to consist of dim coherent state pulses (from laser pulses, for example). The attenuation may occur immediately before the input signal reaches the polarizing beam splitter 2 and/or immediately after the output signal leaves beam splitter 5 of FIG. 1. Otherwise, the device operates with same apparatus as in the preferred embodiment. For example, a phase-based quantum cryptography scheme disclosed in WO 9744936, naming Paul Townsend as inventor could be modified to include a polarization-based sending unit and system 20 of FIG. 1, as discussed with respect to FIG. 4 herein. FIG. 4 could be modified to include a polarization-based sender and system 20 of FIG. 1. Townsend's FIG. 4 system could be modified by replacing the elements labeled 1-6 with a polarization-based sending unit and system 20 of FIG. 1. Thus, the system and method of the present invention may be inserted into pre-existing communication systems to improve those systems.

Another embodiment is directed to use of linear polarizations. Very low intensity sources employing effectively single photon statistics. True single photon sources may be able to produce a photon only in linear states of polarization. Alternatively, signals may only be available from a coherent source able to produce linear polarizations. As a result, one of four linear polarizations—horizontal, vertical, linear at 45°, and linear at −45°—may be input into system 20 of FIG. 1 of the polarization input states previously described. In this case, a quarter wave plate is oriented at 45° in front of polarizing beam splitter 2 in FIG. 1, which can convert horizontal and vertical polarizations into right and left circularly polarized. The only additional affect may be a global phase shift acquired by the states polarized linearly at 45° that will not affect the performance of the invention if subsequent measurements or receivers of the invention's output are only sensitive to the relative phase between the time-separated components. Otherwise, the device operates with same apparatus as the preferred embodiment.

In another embodiment, direct access to the device that produces the polarized signals may be possible, such as in the quantum cryptography scheme disclosed in S. Chiangga et al., Appl Phys B 69 (1999). In such schemes, different parts of the device are designed to produce horizontal and vertical signals separately from signals polarized at +45' to the horizontal. A quarter wave plate can be used to convert horizontal and vertical polarizations into right and left circularly polarizations directly after these signals are produced, rather than at the entrance to system 20 of FIG. 1. This eliminates the phase shift acquired by the signals polarized at ±45° to the horizontal in the previous embodiment. If the input polarization directions are eigenmodes of the circular or linear 45° bases, the device functions with same apparatus as the preferred embodiment.

In another embodiment, beam splitter 5 in FIG. 1 does not have to be a 50-50 beam splitter but can have unequal reflection and transmission coefficients, in which case the two output pulse amplitudes will not have the same magnitude. Such an embodiment may be relevant to so-called strong reference pulse schemes of quantum cryptography, which are discussed in C. H. Bennett, Phys Rev Lett 68, 3121 (1992). The complex reflection and transmission coefficients of BS are taken as r and t, respectively, in this embodiment. Then, the operator transformations described in equations (0.6)-(0.9) are replaced by:

$$b_R^\dagger(t) \to d_R^\dagger(t) = (rb_V^{\dagger}(t-\tau) - itb_V^\dagger(t))/\sqrt{2} \quad (0.18)$$

$$b_L^\dagger(t) \to d_L^\dagger(t) = (rb_V^{\dagger}(t-\tau) + itb_V^\dagger(t))/\sqrt{2} \quad (0.19)$$

$$b_{45°}^\dagger \to d_{45°}^\dagger(t) = (rb_V^{\dagger}(t-\tau) + tb_V^\dagger(t))/\sqrt{2} \quad (0.20)$$

$$b_{-45°}^\dagger \to d_{-45°}^\dagger(t) = (rb_V^{\dagger}(t-\tau) - tb_H^\dagger(t))/\sqrt{2} \quad (0.21)$$

The relative phase between the time-separated components is still determined only by the input polarization state.

In another embodiment, the previously unused output port of beam splitter 5 in FIG. 1 may be used either to act as another phase-encoded source in conjunction with the main output port or to monitor errors or other information in the transmission and reception of the output signal of the preferred embodiment. For a true single photon source in quantum cryptography, a detection event at the receiver end that triggers the recording of a zero or a one should not coincide with a detection event on the previously unused BS output port. The apparatus for this embodiment is identical to that of the preferred embodiment.

In another embodiment, the signals that combine on beam splitter 5 in FIG. 1 from path 11 and path 12, 13, 14 need not be in the same polarization state. The outgoing signal may then contain two pulses, separated in time by τ with the original polarization information still encoded as the relative phase between pulses. However, the polarization state of the two output pulses themselves can be arbitrary with respect to one another by adjustment of the wave plates and polarizers in system 20 of FIG. 1. This embodiment pertains to classical and quantum electromagnetic signals of arbitrary strength. While this embodiment may not appear to be as useful for quantum cryptography, it may have other uses in classical optics, quantum communication, and/or quantum optics.

Considering the present invention and the above embodiments from a more general perspective, where the conversion from polarization to phase-encoded signals takes precedence over any particular application, such as quantum cryptography, and where the present invention may form one piece of an interferometer. Then, the wave plates and polarizers of the preferred and various embodiments could be replaced, in part or whole, by other active or passive optical elements to condition the signals in an appropriate manner for the desired application. For example, desired applications may include quantum cryptography, classical communication, polarization and/or dispersive property measurements of optical fiber in the classical or quantum field regimes, quantum teleportation, and quantum communication.

On the whole, various features of the numerous embodiments above can be combined selectively, when appropriate, to condition the given input polarization states and possible outgoing phase-encoded states as desired. Importantly, the preferred and various embodiments can have a direct impact in quantum cryptography experiments with weak or single photons fields, where the sender produces or would like to produce polarization qubits and the receiver receives or would like to receive phase-encoded qubits.

While only certain features of the present invention have been outlined and described herein, many modifications and changes will be apparent to those skilled in the art. Therefore, the invention is not limited to the embodiments specifically disclosed, but more properly defined by the claims.

I claim:

1. A quantum cryptography system comprising:
   a sending unit adapted to generate polarization-encoded qubits;
   a polarization-to-phase converter operatively coupled to the sending unit and adapted to receive the polarization-encoded qubits and transform them to phase-encoded qubits; and
   a receiving unit operatively coupled to the polarization-to-phase converter and adapted to:
   a) receive the phase-encoded qubits from the polarization-to-phase converter;
   b) split each phase-encoded qubit into a pair of first and second phase-encoded qubits;
   c) randomly phase-modulate one of the phase-encoded qubits in the pair with one of a limited number of select phase modulations;
   d) combine the first and second phase-encoded qubits so that they interfere; and
   e) detect the interfered first and second phase-encoded qubits.

2. The system of claim 1, further including:
   a first optical fiber linking the sending unit to the polarization-to-phase converter; and
   a second optical fiber linking the polarization-to-phase converter to the receiving unit.

3. The system of claim 1, wherein the polarization-to-phase converter includes first and second polarization-dependent paths having different path lengths.

4. A method of converting polarization-encoded qubits to phase-encoded qubits, comprising:
   generating the polarization-encoded qubits at a sending unit and transmitting the polarization-encoded qubits to a polarization-to-phase converter;
   receiving the polarization-encoded qubits at the polarization-to-phase converter;
   converting the polarization-encoded qubits to the phase-encoded qubits at the polarization-to-phase converter; and
   receiving the phase-encoded qubits from the polarization-to-phase converter at a receiving unit, and further including performing the following acts at the receiving unit:
   a) splitting each phase-encoded qubit into a pair of first and second phase-encoded qubits;
   b) randomly phase-modulating one of the first and second qubits with one of a limited number of select phase modulations;
   c) interfering the first and second phase-encoded qubits; and
   d) detecting the result of said interfering.

5. The method of claim 4, wherein converting the polarization-encoded qubits to phase-encoded qubits includes:
   splitting each polarization-encoded qubit into first and second polarization components;
   directing the first and second polarization components over respective polarization-dependent paths having different path lengths; and
   recombining the first and second polarization components.

* * * * *